United States Patent [19]

Righi

[11] Patent Number: 4,879,553
[45] Date of Patent: Nov. 7, 1989

[54] ELECTRONIC PARKING TIME INDICATOR FOR AUTOVEHICLES

[75] Inventor: Nardino Righi, Via Manigo 2, Milano, Italy

[73] Assignees: Dante Siano; Nardino Righi, Italy

[21] Appl. No.: 217,828

[22] Filed: Jul. 12, 1988

[51] Int. Cl.⁴ .......................... B60Q 1/48; G08B 1/00
[52] U.S. Cl. ................................. 340/932.2; 340/539;
340/425.5; 340/309.15; 340/309.3; 340/825.69;
368/6; 368/89; 368/92; 368/243
[58] Field of Search .................... 340/51, 539, 309.15,
340/309.3, 932.2, 425.5, 825.69, 825.72; 368/90,
89, 92, 6–8, 243, 244, 249; 364/467, 569;
194/900, 902

[56] References Cited

U.S. PATENT DOCUMENTS

| | | | |
|---|---|---|---|
| 4,310,890 | 1/1982 | Trehn et al. | 340/51 |
| 4,356,903 | 11/1982 | Lemelson et al. | 340/51 |
| 4,641,125 | 2/1987 | Pesa | 340/309.15 |
| 4,737,758 | 4/1988 | Meiksin et al. | 340/51 |

Primary Examiner—Donnie L. Crosland
Attorney, Agent, or Firm—Larson and Taylor

[57] ABSTRACT

A telecontrol system for a motor-vehicle (1) includes receiver (2) and transmitter (3). The receiver (2) is incorporated in the rearview mirror (4) of a motor-vehicle (1) and includes an electronic digital clock whose display (5) is provided on the back of the mirror and can be viewed through the windshield. The transmitter (3) controls also the elctric actuators (8) for locking and unlocking an doors of the vehicle (1), and the anti-theft device. The transmitter is of pocket size and comprises an electronic minute-counter with respective display (15). Through the provision of a control key (13) on the transmitter (3), the indication of the time is made visible and locked on the display (5) of the electronic clock of the receiver (2), and at the same time the minute-counter of the transmitter (3) is started. Two further control keys (11,12) on the transmitter (3) enable the door-locks of the motor-vehicle (1) to be unlocked and locked, and the anti-theft device (17) to be deactivated and activated. A further control key (14) on the transmitter (3) serves to reset the minute-counter to zero and - when the engine of the motor-vehicle is started - to blank off the display (5) of the electronic clock of the receiver (2).

15 Claims, 3 Drawing Sheets

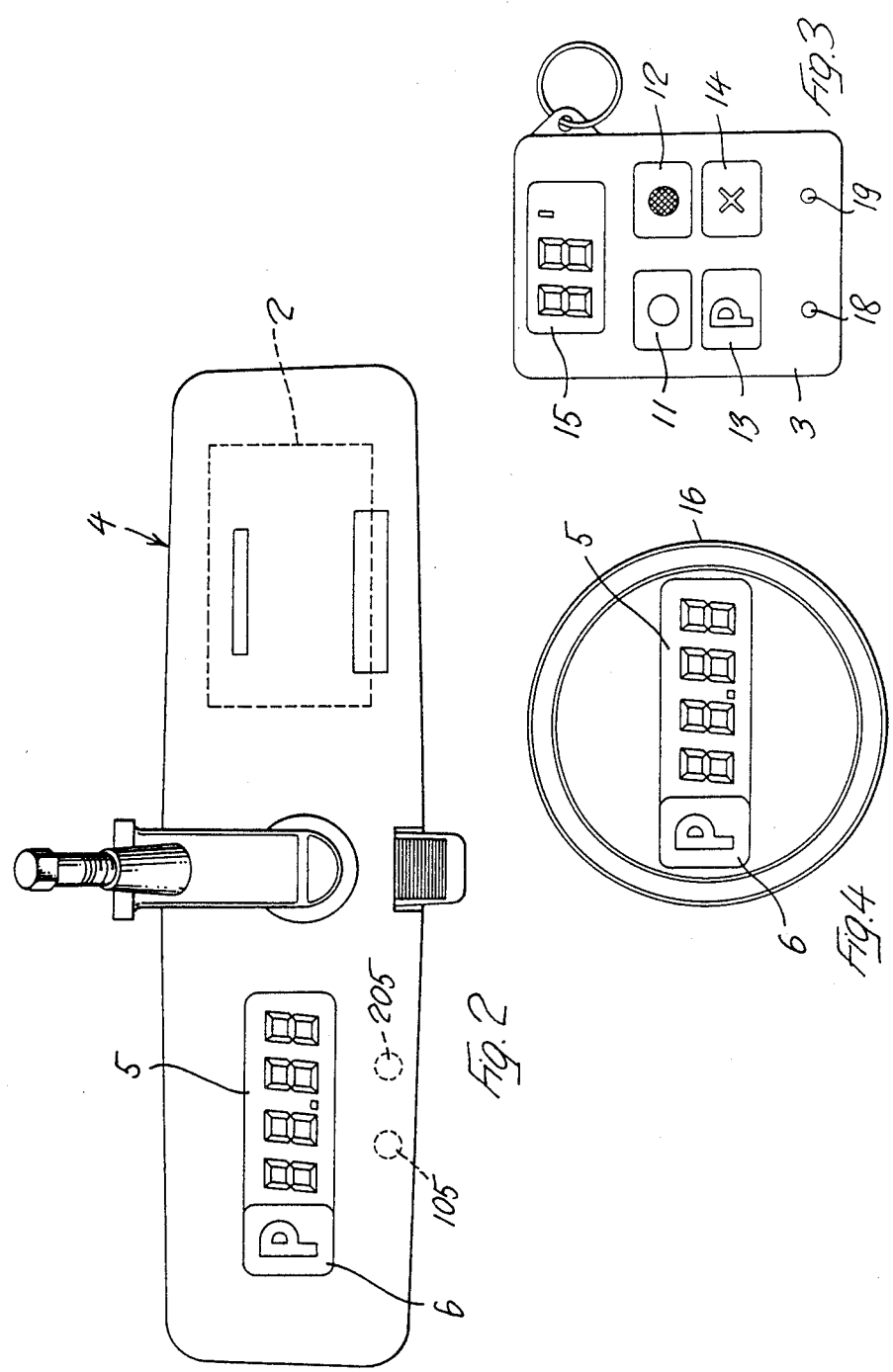

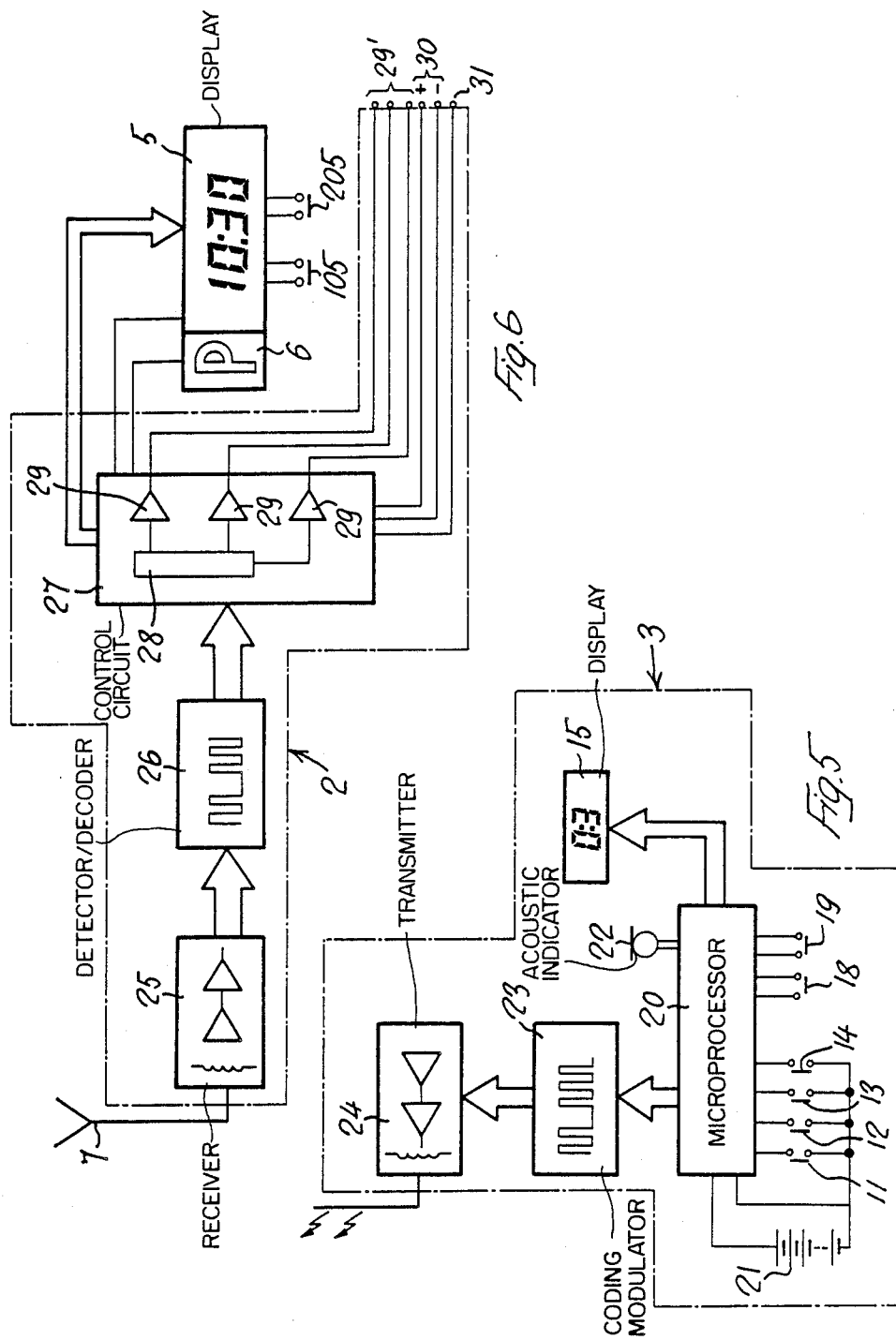

ELECTRONIC PARKING TIME INDICATOR FOR AUTOVEHICLES

SUMMARY OF THE INVENTION

The invention relates to an electronic device for indicating the parking time of motor-vehicles, particularly for parking in the areas requiring a so-called parking-time disc-indicator, or the like, and it aims to provide a device of said kind, adapted to indicate the parking-time, not only on a parked vehicle, but also to a driver at a distance from said parked vehicle.

The device according to the invention comprises a remote-control with a receiver arranged within the motor-vehicle and provided with an electronic digital clock the display of which is clearly visible from the outside, and with a small-sized transmitter, e.g. a pocket transmitter, provided with an electronic digital minute-counter having a respective display, the circuits of both the receiver and the transmitter being designed so that by means of a control member on the transmitter the indication of the time on the electronic digital clock is made visible (is lit) and is simultaneously blocked on the respective display, and, preferably, a parking indication (word and/or symbol) is also made visible (is lit) and simultaneously the electronic digital minute-counter of the transmitter is started.

The transmitter and the respective receiver may use any wireless transmission system, e.g. radio or infrared ray or supersonic transmission.

Preferably, according to the invention, the electronic minute-counter circuit of the transmitter can emit intermittent accoustic signals to remind the user the elapsing of the parking time, and/or it can emit a particular acoustic warning signal indicating with some anticipation the expiration of the permitted parking time that may be entered in the transmitter.

The electronic digital minute-counter of the transmitter can be reset to zero by means of a control member provided on said transmitter. The indication of the time on the respective display of the receiver is made invisible (is extinguished) by means of the starter control for the engine of the vehicle. More particularly, in a preferred embodiment of the invention, the actuation of the control to start the engine of a vehicle pre-conditions the circuit of the receiver to permit the extinction or blanking of the electronic clock display by means of the resetting control of the minute-counter on the transmitter.

According to a further characteristic of the invention, the receiver is incorporated in the rearview mirror within the vehicle, and the display of the respective electronic digital clock is provided on the back of said rearview mirror, so as to be visible through the windshield.

According to another preferred feature on the invention, the transmitter and the receiver can be used as a telecontrol of any one or more other functions concerning the vehicle. More particularly, in a preferred embodiment of the invention, the circuit of the receiver is so constructed as to control the electrical actuators of the doors of the vehicle, and the transmitter is provided with two respective controls, i.e. one for locking and the other for unlocking said doors.

BRIEF DESCRIPTION OF THE DRAWINGS

These and other features of the invention, and the advantages resulting therefrom will appear with more details from the following description of a preferred embodiment, shown by way of a non-limiting example in the accompanying drawings, wherein:

FIG. 2 is a view of the back side of an internal rearview mirror, wherein the receiver of the device according to the invention has been incorporated.

FIG. 3 is a view of the transmitter of the device according to the invention.

FIG. 4 shows the receiver of the device according to the invention housed within a disc-shaped member.

FIG. 5 is a block diagram of the transmitter circuit of the device according to the invention.

FIG. 6 is a block diagram of the receiver circuit of the device according to the invention.

DESCRIPTION OF THE PREFERRED EMBODIMENTS

Figure 1:
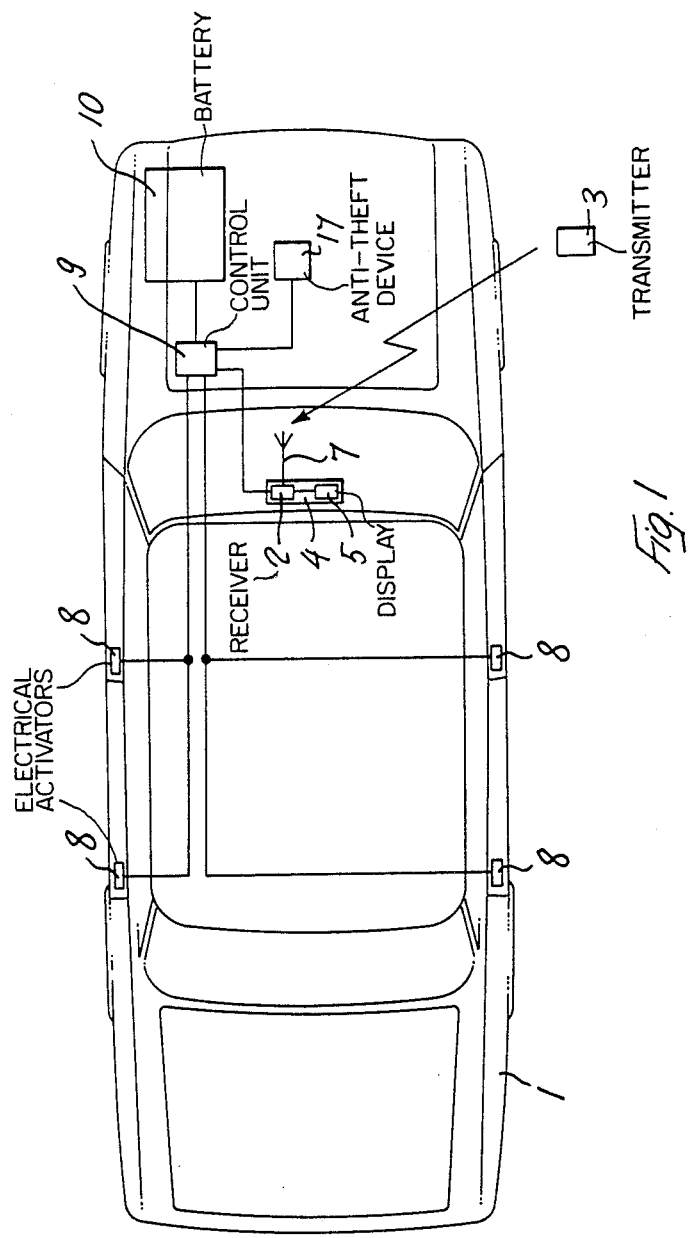
FIG. 1 shows diagrammatically a device according to the invention, with the associated parts of a motor-vehicle.

In the Figures, 1 indicates a motor-vehicle having associated therewith the device according to the invention. Said device comprises a telecontrol, with a receiver 2 and with a corresponding transmitter 3, which may operate on the basis of any transmission system, for example, radio, supersonic, infrared ray system, or the like.

The receiver 2 is incorporated in the internal rearview mirror 4 of the motor-vehicle 1 and comprises an electronic digital clock the dial or display 5 of which is provided on the back of the mirror 4 and can be viewed from the outside through the windshield of the motor-vehicle 1. The display 5 of the electronic digital clock on the back of the internal rearview mirror 4 may be of any suitable type, particularly of a type which is adapted to be read out even when illuminated by the sun. Arranged under the display 5 are two pushbuttons 105 and 205 for entering the hours and the minutes, respectively, on the electronic digital clock. In addition to the display 5 of the electronic digital clock, the receiver 2 comprises a display 6 which indicates the parked condition of the motor-vehicle 1. Said display 6—also provided on the back of the rearwindow 4—may show, for example, the term "waiting" or "parking" or a corresponding symbol. The receiver 2 may be provided with a suitable antenna 7.

In the illustrated embodiment, the locks on the doors of the motor-vehicle 1 are locked and unlocked and/or closed and opened in a known manner by means of electrical actuators 8, e.g. by relays controlled by the circuit of the receiver 2 through the respective control exchange or control unit 9. Of course, both the receiver 2 and the actuators 8 of the door locks of the motor-vehicle 1 and respective control exchange 9 are fed from the battery 10 of the motor-vehicle 1. In addition to the control exchange 9 for opening and closing the doors of the motor-vehicle 1, said receiver can control at the same time an anti-theft device indicated at 17.

The transmitter 3 is a small-sized one, and particularly it is a pocket transmitter, and it may be constructed, for example, in the shape of a key-holder or the like. The transmitter 3 is fed by a cell incorporated therein (not shown) and emits, for each different control function, a corresponding high-frequency low-power signal which is suitably modulated, for example, with coded wave trains. The transmitter 3 comprises an electronic digital minute-counter with a respective dial or display 15. Moreover, in the illustrated example, the transmitter 3 comprises six control keys 11,12,13,14,18 and 19, of which the key 11 serves to unlock or to open the doors of the motor-vehicle 1 and simultaneously to disactivate the anti-theft device, the key 12 serves to lock to to close the doors of the motor-vehicle 1 and the activate the anti-theft device, while the key 13 serves to activate the device at the beginning of a parking period of the motor-vehicle 1 and the key 14 serves to restore the rest conditions of the device at the end of the parking period. The keys 18 and 19—preferably of the type which can only be actuated by a pointed object, such as a pencil or the like—serve to enter the hour and minutes on the digital clock of the receiver 2.

FIG. 5 shows a block diagram of the circuit of the transmitter 3. It is formed by a micro-processor 20 fed by a cell 21 and having connected theretoa the pushbutton controls 11,12,13,14 and 18,19 described above and it controls the minute-counter and display 15, particularly a LED display, preferably liquid crystals display, or the like, and an acoustic indicator 22. The control signals which are generated by actuating the keys 11,12,13,14 and 18,19 are transmitted by the microprocessor 20 to a coding modulator 23, and then to the receiver 2 by means of a transmitter device 24, particularly a low-power UHF transmitter.

FIG. 6 shows the corresponding block diagram of the circuit of the receiver 2. It comprises a receiver 25, particularly a UHF radio-receiver, with an antenna 7 which, through a detector/decoder 26, transmits the received signals, e.g. the trains of coded pulses, to a control circuit 27 which comprises a microprocessor 28 and pilot control circuits 29. Said pilot control circuits 29 are connected at their outputs 29' to the control exchange 9 for closing and opening the doors and to the control exchange for the anti-theft device 17, as well as to other devices if desired. The control circuit 27 is fed by being connected to the outputs 30 to the battery 10 of the motor-vehicle 1, while a further output 31 is provided for blanking the "parking" function of the device. The control circuit 27 has also connected thereto the digital clock, more particularly a timer circuit fulfilling 24-hour clock functions, with pushbuttons 105,205 for entry of hours and minutes, diagrammatically shown in FIG. 6 with the associated display 5 and with the display 6 indicating the parking condition. Said displays 5 and 6 are, specifically, LED displays, preferably high-contrast liquid-crystals which may be exposed to solar radiation with no harm.

The circuits of the receiver 2 and transmitter 3 described above are so constructed as to operate as follows: normally, the displays 5 and 6 of the receiver 2 are blanked off, i.e. no indication is visible thereon, while the minute-counter of the transmitter 3 is inoperative.

When the motor-vehicle 1 is to be parked, for example, in an area requiring a parking-time disc-indicator, the driver steps out of the vehicle 1 with the transmitter 3 and then actuates the key 13 to turn on the two displays 5,6 of the receiver 2 on the back of the internal rearview mirror 4. Therefore, the term "waiting" or "parking" or respective symbol appears on the display 6, while the time shown at that moment by the electronic clock appears on the display 5. However, this indication of the time on the display 5 is blocked or locked at the time indicated, i.e. the indication does not proceed with the counting of the electronic circuit of the clock and, therefore, indicates the time of activation of the device, i.e. the time when the parking has begun.

At the same time, by actuating the key 13, the minute counter of the transmitter 3 is also started to indicate the bearer the time which has elapsed from the beginning of the parking period.

When outside of the vehicle 1, the user can lock the door locks, i.e. close said vehicle and activate the anti-theft device 17, by actuating the respective key 12 of the transmitter 3. The circuit of the transmitter may be so constructed as to emit periodical acoustic indications to remind the bearer the elapsing of time. In a particularly preferred embodiment, the circuit is constructed so that, through the acoustic indicator 22, the transmitter emits a warning acoustic signal with some anticipation with respect to the expiration of the entered parking time; for example, in case of the usual parking time of 60 minutes, the warning signal is emitted at the 45th minute and is repeated more urgingly at the 55th minute.

At the end of the parking period, the user—in order to get into the vehicle—unlocks the door locks and disactivates the anti-theft device by actuating the respective key 11 of the transmitter 3 and resets the minute-counter to zero by actuating the key 14.

Upon starting the engine of the vehicle 1, the actuation of the respective switch connected to the output 31 to control the turnoff of the control circuit 27 of the receiver 2 (see FIG. 6) causes the blanking off of the display 5 of the respective electronic clock and the blanking off of the display 6 indicating the parking condition. In a modified embodiment, the starting of the engine of the vehicle pre-conditions the control circuit 27 of the receiver 2 so that the two displays 5 and 6 may be blanked off by actuating the same key 14 of the transmitter 3, that is used to reset the minute-counter to zero.

In order to set the time on the electronic digital clock of the receiver 2, the user may either actuate the keys 105,205 of the receiver 2 or the keys 18 and 19 of the transmitter 3. In a preferred embodiment of the invention, the keys 105,18 are used to enter the hour, while the keys 205,19 are used to enter the minutes. However, this function cannot be activated when the external display shows the initial time of parking, that is when the device is in the "parking" condition. During the operation of time setting, the digits of the entered hour and minutes will appear on the display and this indication disappears automatically if the keys 105,205 or 18,19 are not actuated within 5 seconds.

Of course, the invention is not limited to the embodiment just described and shown, but broad changes and modifications may be made thereto, especially as for the contruction thereof and the practical realization of the circuits of the receiver 2 and transmitter 3. Thus, for example, the transmitter 3 may be provided with means permitting to enter and to change a given parking time, such as the permitting parking time in the area where an indicator disc is required. Moreover, instead of being incorporated in the internal rearview mirror, the receiver 2 and the two displays 5 (of the electronic clock) and 6 (of the parking condition) may be provided in any other part separate from said rearview mirror, i.e. in a purposely-made part to be applied on the vehicle or in a part provided on the vehicle previously. Thus, for example, FIG. 4 shows a disc 16 containing the receiver and including the parking condition display 6. Said disc 16 (which may be formed by a body of any other shape) may be provided with any suitable means to be applied to the inner side of a windshield or to any part of the motor-vehicle in proximity of the windshield, with the two displays 5 and 6 visible from the outside, just as a parking-time indicator-disc proper, or the like. All the above can be done without departing from the basic principle as set forth above and as claimed hereinafter.

I claim:

1. An electronic device for indicating the parking time of motor-vehicles, particularly for parking in the areas requiring a parking-time disc-indicator, or the like, said electronic device comprising a remote-control unit including a receiver arranged within the motor-vehicle and provided with an electronic digital clock having an associated display which is clearly visible from the outside, and with a small-sized transmitter, said transmitter including an electronic digital minute-counter having a respective display, and the transmitter further including a control member for, when actuated, causing the indication of the time on the electronic digital clock of the receiver to be made visible and to be simultaneously locked on the display of the electronic digital clock of the receiver, and causing, at the same time, starting of the electronic digital minute-counter of the transmitter.

2. A device according to claim 1, characterized in that said receiver comprises a display indicating the parking condition of the motor-vehicle by means of a corresponding representation and being made visible simultaneously with the display of the electronic clock in response to the actuation of the corresponding control member of the transmitter.

3. A device according to claim 1, characterized in that the electronic minute-counter circuit of the transmitter transmits acoustic signals at intervals, and said transmitter includes acoustic warning means.

4. A device according to claim 1, characterized in that said transmitter comprises means for entering any other desired parking time and means for producing a warning signal in advance of the expiration of the parking time entered.

5. A device according to claim 1, characterized in that said transmitter includes control means for resetting to zero said electronic digital minute-counter of the transmitter.

6. A device according to claim 1, for a motor-vehicle including an engine and a starter switch for the engine characterized in that the time indicated on the display of the receiver is made invisible in response to actuation of the starter switch for the engine of the motor-vehicle, a control output of the receiver being connected to the starter switch.

7. A device according to claim 5, for a motor-vehicle including an engine and a control device for starting the engine, characterized in that the actuation of the control device to start the engine of the motor-vehicle pre-conditions the receiver so as to permit the display of the electronic clock to be blanked off by the control means for resetting to zero the minute-counter of said transmitter.

8. A device according to claim 2, for a motor-vehicle including a windshield and an internal rearview mirror having a back side, characterized in that the receiver is incorporated in the internal rearview mirror of the motor-vehicle, while the display of the electronic clock and the display indicating the parking condition are provided on the back side of said mirror, so as to be viewed through the windshield.

9. A device according to claim 1 for a motor-vehicle having further operational functions associated therewith, characterized in that the transmitter and the receiver include means for remotely controlling at least one of the operational further functions of the motor-vehicle.

10. A device according to claim 9, for a motor-vehicle including doors with door locks and electrical actuators for locking and unlocking the door locks, characterized in that the receiver includes means for controlling the electrical actuators for locking and unlocking the door locks of the motor-vehicle, said controlling means comprising control pilot circuits with control outputs, said transmitter comprising corresponding control means for said pilot circuits.

11. A device according to claim 10, for a motor-vehicle including an anti-theft device, characterized in that the receiver includes means for controlling the activation and disactivation of the anti-theft device of the motor-vehicle, in response to a command for closing and opening, respectively, of the doors of the motor-vehicle.

12. A device according to claim 1, for a motor-vehicle including doors with door locks, and an anti-theft device, characterized in that the transmitter comprises a microprocessor fed by a cell, with a first control key for activating the parking function, a second control key for resetting the zero the minute-counter, a third control key for opening or unlocking the doors of the motor-vehicle and disactivating the anti-theft device and a fourth control key for closing or locking the doors and activating the anti-theft device, and with two further control keys for entering the hour and minutes, respectively, of the clock of the receiver during times other than during the "parking" condition of the device, said microprocessor having connected thereto a minute-counter with a display and a acoustic indicator, while the signals produced by the microprocessor are coded in a coding modulator and are transmitted to the receiver by means of a transmitter circuit.

13. A device according to claim 12, for a motor-vehicle including a battery, characterized in that the receiver comprises a radio-receiver with an antenna connected to a control circuit by means of a detector/decoder, said control circuit comprising a microprocessor and at least one control pilot circuit with control outputs and said control circuit having connected thereto the electronic digital clock with said associated display and the parking condition display, said control circuit being fed from the battery of the motor vehicle through further outputs and being provided wth a control input for disactivation of the device.

14. A device according to claim 1, characterized in that the receiver comprises two keys for entering the hour and minutes, respectively, of the digital clock during a time other than during the "parking" condition of the device.

15. An electronic device according to claim 2, characterized in that the receiver and the respective said displays for the electronic clock and the parking condition are incorporated in a part which can be used as a parking-time indicating disc.

* * * * *